(12) United States Patent
McMurry et al.

(10) Patent No.: US 9,917,729 B2
(45) Date of Patent: Mar. 13, 2018

(54) METHODS, SYSTEMS, AND COMPUTER READABLE MEDIA FOR MULTI-LAYER ORCHESTRATION IN SOFTWARE DEFINED NETWORKS (SDNS)

(71) Applicant: Oracle International Corporation, Redwood Shores, CA (US)

(72) Inventors: Sam Eric McMurry, Richardson, TX (US); Ajay Padmakar Deo, Carrollton, TX (US); Ben Allen Campbell, Irving, TX (US)

(73) Assignee: Oracle International Corporation, Redwood Shores, CA (US)

( * ) Notice: Subject to any disclaimer, the term of this patent is extended or adjusted under 35 U.S.C. 154(b) by 491 days.

(21) Appl. No.: 14/692,710

(22) Filed: Apr. 21, 2015

(65) Prior Publication Data
US 2016/0315809 A1   Oct. 27, 2016

(51) Int. Cl.
*H04L 12/24* (2006.01)

(52) U.S. Cl.
CPC ...... *H04L 41/0806* (2013.01); *H04L 41/0886* (2013.01)

(58) Field of Classification Search
CPC .............. H04L 41/0806; H04L 41/0886
See application file for complete search history.

(56) References Cited

U.S. PATENT DOCUMENTS

| 6,505,244 | B1 | 1/2003 | Natarajan et al. |
| 7,522,517 | B1 | 4/2009 | Johnson |
| 8,914,526 | B1 | 12/2014 | Lindquist et al. |
| 9,298,515 | B2 | 3/2016 | McMurry et al. |
| 9,369,390 | B2 | 6/2016 | Bantukul et al. |
| 9,391,897 | B2 | 7/2016 | Sparks et al. |
| 9,398,492 | B2 | 7/2016 | Deo |
| 9,450,817 | B1 * | 9/2016 | Bahadur ............... H04L 45/64 |
| 9,537,775 | B2 | 1/2017 | McMurry et al. |

(Continued)

FOREIGN PATENT DOCUMENTS

| CN | 101001401 A | 7/2007 |
| CN | 101127609 A | 2/2008 |

(Continued)

OTHER PUBLICATIONS

Notice of Allowance and Fee(s) Due for U.S. Appl. No. 14/086,950 (dated Aug. 2, 2017).

(Continued)

*Primary Examiner* — Larry Donaghue
(74) *Attorney, Agent, or Firm* — Jenkins, Wilson, Taylor & Hunt, P.A.

(57) ABSTRACT

Methods, systems, and computer readable media for multi-layer orchestration in software defined networks (SDNs) are disclosed. In one example, the method includes receiving orchestration related data for implementing a network service using the network resources within the SDN, determining configuration information for the network resources based on the orchestration related data and protocol layer capability of the network resources, wherein determining the configuration information includes identifying the network resources having the protocol layer capability to provide network services, and providing the configuration information to the network resources.

20 Claims, 5 Drawing Sheets

(56) References Cited

U.S. PATENT DOCUMENTS

| | | |
|---|---|---|
| 2002/0004827 A1 | 1/2002 | Ciscon et al. |
| 2002/0091810 A1 | 7/2002 | Hundscheidt et al. |
| 2004/0199632 A1 | 10/2004 | Romero et al. |
| 2008/0250156 A1 | 10/2008 | Agarwal et al. |
| 2009/0232011 A1 | 9/2009 | Li et al. |
| 2009/0327079 A1 | 12/2009 | Parker et al. |
| 2010/0071035 A1 | 3/2010 | Budko et al. |
| 2010/0080172 A1 | 4/2010 | Jin et al. |
| 2010/0125477 A1 | 5/2010 | Mousseau et al. |
| 2010/0211956 A1 | 8/2010 | Gopisetty et al. |
| 2010/0217850 A1 | 8/2010 | Ferris |
| 2010/0220622 A1 | 9/2010 | Wei |
| 2010/0299451 A1 | 11/2010 | Yigang et al. |
| 2011/0016467 A1 | 1/2011 | Kane |
| 2011/0040845 A1 | 2/2011 | Cai et al. |
| 2011/0061061 A1 | 3/2011 | Chen et al. |
| 2011/0090900 A1 | 4/2011 | Jackson et al. |
| 2011/0131332 A1 | 6/2011 | Bouazizi |
| 2011/0200053 A1 | 8/2011 | Kanode et al. |
| 2011/0202676 A1 | 8/2011 | Craig et al. |
| 2012/0057602 A1 | 3/2012 | Tanimoto |
| 2012/0158994 A1 | 6/2012 | McNamee et al. |
| 2012/0239771 A1 | 9/2012 | Rasanen |
| 2012/0281540 A1 | 11/2012 | Khan et al. |
| 2012/0300615 A1 | 11/2012 | Kempf et al. |
| 2012/0303835 A1 | 11/2012 | Kempf et al. |
| 2013/0003745 A1 | 1/2013 | Nishimura |
| 2013/0019277 A1 | 1/2013 | Chang et al. |
| 2013/0064093 A1 | 3/2013 | Ridel et al. |
| 2013/0124712 A1 | 5/2013 | Parker |
| 2013/0173810 A1 | 7/2013 | Subramaniam |
| 2013/0188489 A1 | 7/2013 | Sato |
| 2013/0223219 A1 | 8/2013 | Mir et al. |
| 2013/0250770 A1 | 9/2013 | Zou et al. |
| 2013/0263208 A1 | 10/2013 | Challa |
| 2013/0266007 A1 | 10/2013 | Kumbhare et al. |
| 2013/0343295 A1 | 12/2013 | Deo |
| 2014/0026231 A1 | 1/2014 | Barak et al. |
| 2014/0032651 A1 | 1/2014 | Singh et al. |
| 2014/0089495 A1 | 3/2014 | Akolkar et al. |
| 2014/0105140 A1 | 4/2014 | Guo |
| 2014/0172739 A1 | 6/2014 | Anderson et al. |
| 2014/0192646 A1 | 7/2014 | Mir et al. |
| 2014/0193154 A1 | 7/2014 | Graham et al. |
| 2014/0215076 A1 | 7/2014 | Grothues |
| 2014/0215077 A1 | 7/2014 | Soudan et al. |
| 2014/0233389 A1 | 8/2014 | Bantukul et al. |
| 2014/0237111 A1 | 8/2014 | McMurry et al. |
| 2014/0304416 A1 | 10/2014 | Khasnabish |
| 2014/0310388 A1 | 10/2014 | Djukic et al. |
| 2014/0348068 A1 | 11/2014 | Morper et al. |
| 2015/0036505 A1 | 2/2015 | Sparks et al. |
| 2015/0046591 A1 | 2/2015 | Zhu et al. |
| 2015/0085663 A1 | 3/2015 | McMurry et al. |
| 2015/0124622 A1* | 5/2015 | Kovvali ............ H04W 28/0215 370/236 |
| 2015/0131997 A1* | 5/2015 | Syed ................ H04Q 11/0066 398/69 |
| 2015/0142940 A1 | 5/2015 | McMurry et al. |
| 2015/0149656 A1 | 5/2015 | McMurry et al. |
| 2015/0172115 A1 | 6/2015 | Nguyen et al. |
| 2015/0200838 A1* | 7/2015 | Nadeau ................ H04L 45/124 398/58 |
| 2015/0215228 A1 | 7/2015 | McMurry |
| 2015/0372929 A1* | 12/2015 | Rochwerger ............ H04L 45/38 709/238 |
| 2016/0197850 A1* | 7/2016 | Peng .................. H04L 41/5003 709/226 |
| 2016/0205015 A1* | 7/2016 | Halligan ................ H04L 45/56 370/400 |

FOREIGN PATENT DOCUMENTS

| | | |
|---|---|---|
| JP | 2013-098597 A | 5/2013 |
| JP | 6096325 B2 | 3/2017 |
| JP | 6163204 B2 | 7/2017 |
| KR | 10-2009-0033968 | 4/2009 |
| KR | 10-2012-0055955 | 6/2012 |
| KR | 10-2012-0059542 | 6/2012 |
| WO | WO 2009/070179 A1 | 6/2009 |
| WO | WO 2011/013805 A1 | 2/2011 |
| WO | WO 2011/101745 A2 | 8/2011 |
| WO | WO 2011/161575 A1 | 12/2011 |
| WO | WO 2012/003764 A1 | 1/2012 |
| WO | WO 2012/055446 A1 | 5/2012 |
| WO | WO 2012/056816 A1 | 5/2012 |
| WO | WO 2012/100092 A2 | 7/2012 |
| WO | WO 2012/129167 A1 | 9/2012 |
| WO | WO 2012/130264 A1 | 10/2012 |
| WO | WO 2012/160465 A1 | 11/2012 |
| WO | WO 2013/188665 A1 | 12/2013 |
| WO | WO 2014/127346 A1 | 8/2014 |
| WO | WO 2014/127347 A1 | 8/2014 |
| WO | WO 2015/017422 A1 | 2/2015 |
| WO | WO 2015/041750 A1 | 3/2015 |
| WO | WO 2015/077377 A1 | 5/2015 |
| WO | WO 2015/080906 A1 | 6/2015 |
| WO | WO 2015/116449 A1 | 8/2015 |

OTHER PUBLICATIONS

Communication under Rule 71(3) EPC of Intention to Grant for European Patent Application No. 14 710 682.7 (dated Jun. 21, 2017).

Applicant-Initiated Interview Summary for U.S. Appl. No. 14/166,790 (dated Jun. 12, 2017).

Letter Regarding Japanese Office Action for Japanese Patent Application No. 2016-531821 (dated Jun. 6, 2017).

Letter Regarding Notice of Grant for Japanese Patent Application No. 2015-517426 (dated May 30, 2017).

Notification of the First Office Action for Chinese Patent Application No. 201380031363.5 (dated May 3, 2017).

Notice of Allowance and Fee(s) Due for U.S. Appl. No. 13/863,351 (dated Apr. 20, 2017).

Letter regarding Official Notice of Grant for Japanese Patent Application No. 2015-558193 (dated Feb. 28, 2017).

Non-Final Office Action for U.S. Appl. No. 14/166,790 (dated Feb. 28, 2017).

Letter regaridng Final Decision for Rejection for Japanese Patent Application No. 2015/555185 (dated Feb. 14, 2017).

Letter regarding Official Notice of Grant for Japanese Patent Application No. 2015-558191 (dated Jan. 31, 2017).

Examiner Initiated Interview Summary and Notice of Decision from Post-Prosecution Pilot Program (P3) Conference for U.S. Appl. No. 14/092,898 (dated Jan. 30, 2017).

Non-Final Office Action for U.S. Appl. No. 14/086,950 (dated Jan. 3, 2017).

Letter regarding Japanese Office Action for Japanese Patent Application No. 2015-517426 (dated Dec. 6, 2016).

Advisory Action, Applicant-Initiated Interview Summary, and AFCP 2.0 Decision for U.S. Appl. No. 14/166,790 (dated Nov. 30, 2016).

Communication of European publication number and information on the application of Article 67(3) EPC for European Patent Application No. 15703372.1 (dated Nov. 9, 2016).

Applicant-Initiated Interview Summary for U.S. Appl. No. 14/166,790 (dated Oct. 28, 2016).

Nakahira, "Applications for Software Defined Network Technologies on Edge Networks in the Future Network," IEICE Technical Report, vol. 112, No. 230, pp. 109-114 (Oct. 3, 2012).

Notification of Transmittal of the International Search Report and the Written Opinion of the International Searching Authority, or the Declaration for International Application No. PCT/US2014/066240 (dated May 13, 2015).

(56) References Cited

OTHER PUBLICATIONS

Non-Final Office Action for U.S. Appl. No. 13/956,304 (dated May 4, 2015).
Notification of Transmittal of the International Search Report and the Written Opinion of the International Searching Authority, or the Declaration for PCT International Application No. PCT/US2015/012250 (dated Mar. 31, 2015).
Communication of European Publication Number and Information on the Application of Article 67(3) EPC for European Application No. 13804779.0 (dated Mar. 25, 2015).
Non-Final Office Action for U.S. Appl. No. 14/034,478 (dated Mar. 23, 2015).
Non-Final Office Action for U.S. Appl. No. 13/917,200 (dated Mar. 16, 2015).
Notification of Transmittal of the International Search Report and the Written Opinion of the International Searching Authority, or the Declaration for International Application No. PCT/US2014/066469 (dated Feb. 20, 2015).
Commonly-assigned, co-pending International Application No. PCT/US15/12250 for "Methods, Systems, and Computer Readable Media for a Cloud-Based Virtualization Orchestrator," (Unpublished, filed Jan. 21, 2015).
Notification of Transmittal of the International Search Report and the Written Opinion for of the International Searching Authority, or the Declaration for International Application No. PCT/US2014/048651 (dated Nov. 17, 2014).
Notification of Transmittal of the International Search Report and the Written Opinion of the International Searching Authority, or the Declaration for International Application No. PCT/US2014/048644 (dated Oct. 17, 2014).
Notification of Transmittal of the International Search Report and the Written Opinion of the International Searching Authority, or the Declaration for International Application No. PCT/US2014/016853 (dated Jun. 6, 2014).
Notification of Transmittal of the International Search Report and the Written Opinion of the International Searching Authority, or the Declaration for International Application No. PCT/US2014/016860 (dated Jun. 4, 2014).
Commonly-assigned, co-pending U.S. Appl. No. 14/166,790 for "Methods, Systems, and Computer Readable Media for a Cloud-Based Virtualization Orchestrator," (Unpublised, filed Jan. 28, 2014).
"Network Function Virtualization (NFV) Management and Orchestration," ETSI, Group Specification, GS NFV-MAN 001 V0.0.11, pp. 1-74 (Oct. 18, 2013).
Notification of Transmittal of the International Search Report and the Written Opinion of the International Searching Authority, or the Declaration for International Application No. PCT/US2013/045652 (dated Sep. 17, 2013).
Tschofenig, "Diameter Overload Architecture and Information Model," draft-tschofenig-dime-overload-arch-00.txt, DIME, pp. 1-9 (Jul. 16, 2013).
"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).
Wendong et al., "Autonomicity Design in OpenFlow Based Software Defined Networking," GC'12 Workshop: The 4th IEEE International Workshop on Management of Emerging Networks and Services, pp. 818-823 (Dec. 3, 2012).
"3rd Generation Partnership Project; Technical Specification Group Services and System Aspects; Policy and charging control architecture (Release 11)," 3GPP TS 23.203, V11.8.0 pp. 1-179 (Dec. 2012).
Fajardo et al., "Diameter Base Protocol," RFC 6733, pp. 1-152 (Oct. 2012).
"Software-Defined Networking: The New Norm for Network," ONF White Paper, Open Networking Foundation, pp. 1-12 (Apr. 13, 2012).

"Split Architecture for Large Scale Wide Area Networks," SPARC ICT-258457 Deliverable D3.3, pp. 1-129 (Dec. 1, 2011).
"OpenFlow Switch Specification," https://www.opennetworking.org/images/stories/download.sdn-resources/onf-specifications/openflow/openflow-spec-v1.2.pdf, Version 1.2 (Wire Protocol 0x03), Open Networking Foundation, pp. 1-85 (Dec. 5, 2011).
"OpenFlow Switch Specification," Version 1.1.0 Implemented (Wire Protocol 0x02), www.openflow.org, pp. 1-56 (Feb. 28, 2011).
Chapman et al., "Software architecture definition for on-demand cloud provisioning," Cluster Computing, vol. 15, No. 2, pp. 79-100 (Feb. 27, 2011).
3rd Generation Partnership Project, "Technical Specification Group Services and System Aspects; Policy and charging control architecture (Release 9)," 3GPP TS 23.203 V9.3.0 (Dec. 2009).
Dörnemann et al., "On-Demand Resource Provisioning for BPEL Workflows Using Amazon's Elastic Compute Cloud," 9th IEEE/ACM International Symposium on Cluster Computing and the Grip, pp. 140-147 (May 18, 2009).
Communication of European Publicaiton Number and Information on the Application of Article 67(3) EPC for European Patent Application No. 14755208.7 (dated May 11, 2016).
Applicant-Initiated Interview Summary for U.S. Appl. No. 14/166,790 (dated Apr. 14, 2016).
Non-Final Office Action for U.S. Appl. No. 14/034,478 (dated Apr. 5, 2016).
Notice of Allowance and Fee(s) Due for U.S. Appl. No. 13/917,200 (dated Mar. 28, 2016).
Notice of Allowance and Fee(s) Due for U.S. Appl. No. 13/956,304 (dated Mar. 16, 2016).
Notice of Allowance and Fee(s) Due for U.S. Appl. No. 14/182,864 (dated Feb. 17, 2016).
Non-Final Office Action for U.S. Appl. No. 14/166,790 (dated Feb. 2, 2016).
Applicant-Initiated Interview Summary for U.S. Appl. No. 13/956,304 (dated Feb. 1, 2016).
Extended European Search Report for European Application No. 13804779.0 (dated Jan. 19, 2016).
Advisory Action Before the Filing of an Appeal Brief and AFCP 2.0 Decision for U.S. Appl. No. 13/917,200 (dated Jan. 14, 2016).
Applicant-Initiated Interview Summary for U.S. Appl. No. 14/092,898 (dated Jan. 14, 2016).
Applicant-Initiated Interview Summary for U.S. Appl. No. 14/182,864 (dated Dec. 16, 2015).
Non-Final Office Action for U.S. Appl. No. 14/086,950 (dated Dec. 4, 2015).
Supplemental Notice of Allowability for U.S. Appl. No. 14/182,800 (dated Dec. 1, 2015).
Communication of European Publication Number and Information on the Applicaiton of Article 67(3) EPC for European Patent Application No. 14710682.7 (dated Nov. 25, 2015).
Advisory Action for U.S. Appl. No. 14/034,478 (dated Nov. 17, 2015).
Notice of Allowance and Fee(s) Due for U.S. Appl. No. 14/182,800 (dated Nov. 10, 2015).
Final Office Action for U.S. Appl. No. 13/956,304 (dated Nov. 3, 2015).
Final Office Action for U.S. Appl. No. 13/917,200 (dated Oct. 22, 2015).
Non-Final Office Action for U.S. Appl. No. 14/092,898 (dated Oct. 8, 2015).
Non-Final Office Action for U.S. Appl. No. 14/182,864 (dated Sep. 23, 2015).
Final Office Action for U.S. Appl. No. 14/034,478 (dated Sep. 8, 2015).
Applicant-Initiated Interview Summary for U.S. Appl. No. 13/956,304 (dated Aug. 5, 2015).
Applicant-Initiated Interview Summary for U.S. Appl. No. 13/917,200 (dated Jul. 27, 2015).
Kempf et al., "Moving the Mobile Evolved Packet Core to the Cloud," 2012 Fifth International Workshop on Selected Topics in Mobile and Wireless Computing, pp. 1-8 (Oct. 8, 2012).

(56) References Cited

OTHER PUBLICATIONS

Li Erran et al., "CellSDN: Software-Defined Cellular Networks," ftp://ftp.cs.princeton.edu/techeports/2012/922.pdf, pp. 1-6 (Apr. 20, 2012).

Advisory Action Before the Filing of an Appeal Brief for U.S. Appl. No. 14/086,950 (dated Sep. 9, 2016).

Final Office Action for U.S. Appl. No. 14/092,898 (dated Sep. 8, 2016).

Communication of European publication number and information on the application of Article 67(3) EPC for European Application No. 14812837.4 (dated Sep. 7, 2016).

Communication of European publication number and information on the application of Article 67(3) EPC for European Application No. 14812840.8 (dated Aug. 31, 2016).

Letter Regarding Office Action for Japanese Patent Application No. 2015-558193 (dated Aug. 30, 2016).

Letter Regarding Office Action for Japanese Patent Application No. 2015-558191 (dated Aug. 30, 2016).

Notice of Allowance and Fee(s) Due and Examiner-Initiated Interview Summary for U.S. Appl. No. 14/034,478 (dated Aug. 25, 2016).

Notice of Allowance and Fee(s) Due, Applicant-Initiated Interview Summary, and AFCP 2.0 Decision for U.S. Appl. No. 13/749,655 (dated Aug. 22, 2016).

Final Office Action for U.S. Appl. No. 14/166,790 (dated Aug. 11, 2016).

Communication of European publication number and information on the application of Article 67(3) EPC for European Patent Application No. 14755210.3 (dated Jul. 6, 2016).

Final Office Action for U.S. Appl. No. 14/086,950 (dated Jul. 1, 2016).

Business Communication, Kabushikikaisha Business-Communication-sha (Japan), vol. 49, No. 11, pp. 60-61 (dated Nov. 1, 2012).

\* cited by examiner

METHODS, SYSTEMS, AND COMPUTER READABLE MEDIA FOR MULTI-LAYER ORCHESTRATION IN SOFTWARE DEFINED NETWORKS (SDNS)

TECHNICAL FIELD

The subject matter described herein relates to configuring software defined networks (SDNs). More particularly, the subject matter described herein relates to methods, systems, and computer readable media for multi-layer orchestration in SDNs.

BACKGROUND

In the telecommunications field, various triggering events may require configuring or reconfiguring connectivity and configuration of network elements in an existing network in order to pass network traffic amongst these elements. Some existing networks are software defined networks (SDNs) where network elements, such as routers and switches can be dynamically controlled by SDN controllers to meet network demands. Orchestrators are network nodes configured with capability to partially automate connectivity and other resource allocation decisions among only a portion of the network resources within the SDN, as well as provide a view and control of broader networks.

Conventionally, providing connectivity to all network resources has been performed during an operations stage, since orchestrators are not provisioned with functionality for automating decisions among all network resources. In addition, such existing orchestrators typically operate on a single layer, for example, by orchestrating only switches, or only routers, etc. As a result, orchestrating network resources is currently, at least in part, a "pen and paper" endeavor.

Accordingly, a need exists for methods, systems, and computer readable media for multi-layer orchestration in SDNs in order to reduce resource utilization, reduce energy usage, and allow for additional automation of the orchestration process.

SUMMARY

According to one aspect, the subject matter described herein may include a method for multi-layer orchestration in a software defined network (SDN). For example, the method may include receiving orchestration related data for implementing a network service using the network resources within the SDN, determining configuration information for the network resources based on the orchestration related data and protocol layer capability of the network resources, wherein determining the configuration information includes identifying the network resources having the protocol layer capability to provide network services, and providing the configuration information to the network resources.

According to another aspect, the subject matter described herein may include a system for multi-layer orchestration in an SDN. For example, the system may include an orchestrator comprising at least one processor and memory, and for optimizing network resources within the SDN. In this example, the orchestrator may be configured to receive orchestration related data for implementing a network service using the network resources within the SDN, determine configuration information for the network resources based on the orchestration related data and protocol layer capability of the network resources, and provide the configuration information to the network resources, wherein the orchestrator being configured to determine the configuration information includes identifying the network resources having the protocol layer capability to provide network services.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "network", "software defined network", and/or "SDN" may refer to any network, virtual or physical, where the network includes one or more network services being managed through abstraction of lower-level functionality.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for multi-layer orchestration in software defined networks (SDNs) in order to optimize network resources within the SDNs.

In some embodiments, references to various "layers" refers to the layers defined by the Open Systems Interconnection (OSI) model, which is commonly known in the art of network system architecture as a conceptual model that characterizes and standardizes the internal functions of a communication system by partitioning it into abstraction layers. Alternatively, "layers" may refer to the layers defined by the Transmission Control Protocol/Internet Protocol (TCP/IP) reference protocol or any other known network architecture.

In some embodiments, orchestration related data associated with implementing a network service in an SDN may be received by an orchestrator after the orchestration related data has been collected and transmitted by an operations module. The orchestration related data may comprise at least one of a network service catalogue for defining network resources needed to implement a network service order and a network service graph for defining connectivity of and/or between each of these network resources. Alternatively, the orchestration related data may comprise analytics information, dynamic scaling information, etc.

The orchestrator may further determine configuration information for the network resources based on the orchestration related data and protocol layer capability of the network resources. Protocol layer capability of a network resource may be an ability of a network resource to control network traffic using at least one criterion associated with a particular protocol layer. The orchestrator may further analyze the orchestration related data and the protocol layer capability of the network resources for identifying which of the network resources receive configuration information and for determining the configuration information to provide. For example, the orchestrator may analyze the orchestration related data and the protocol layer capability of the network resources using an algorithm to determine which of the network resources provide an optimized flow of network traffic. Thus, the configuration information may be provided to those network resources that provide an optimized flow of network traffic, as determined by the orchestrator.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
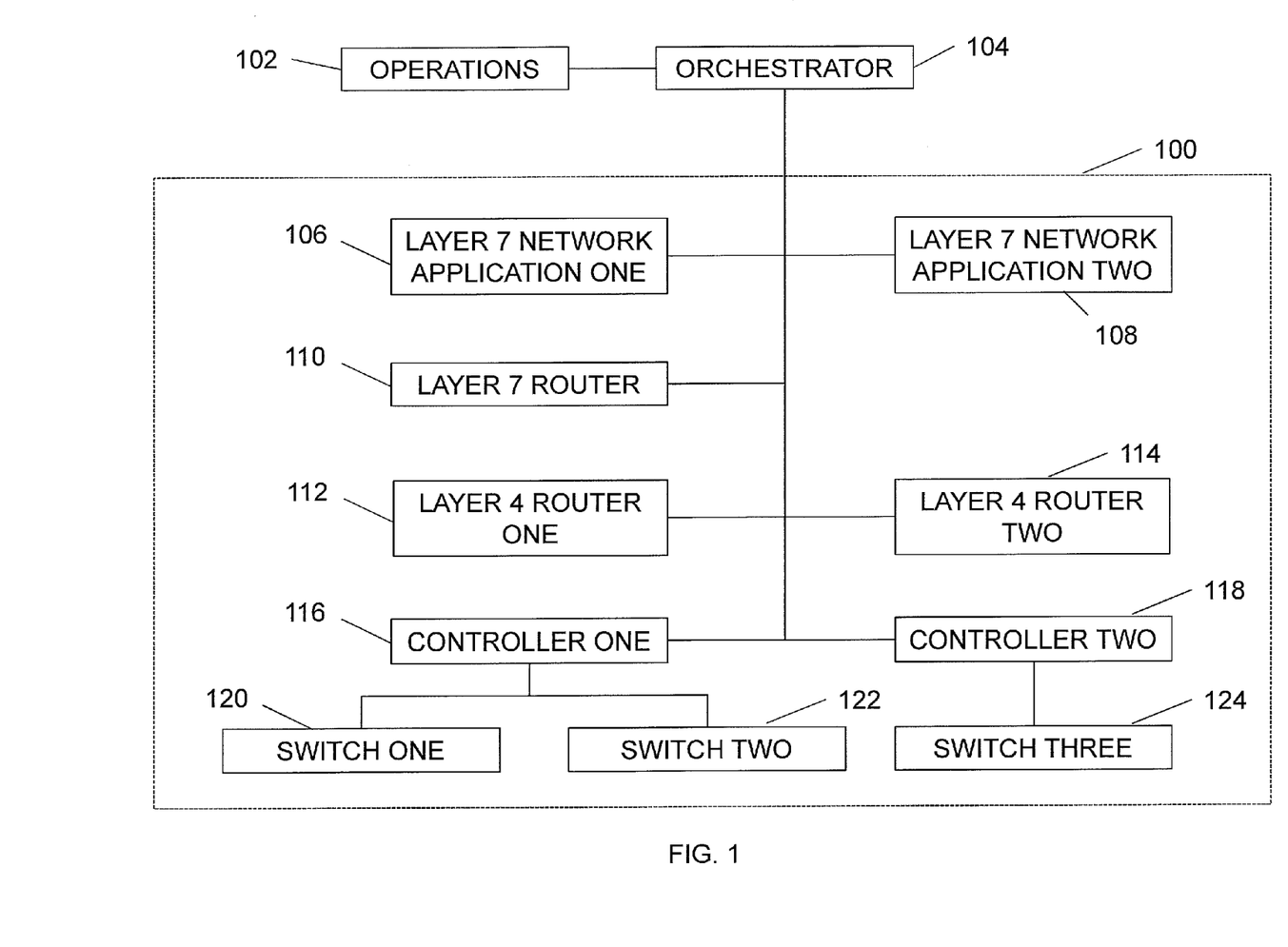
FIG. 1 is a diagram illustrating an exemplary embodiment of a system for multi-layer orchestration in a software defined network (SDN) according to an embodiment of the subject matter described herein.

FIG. 1 is a diagram illustrating an exemplary embodiment of a system for multi-layer orchestration in an SDN, generally designated 100, in order to optimize network resources within the SDN. SDN 100 can comprise an architecture with resource functionality at multiple protocol layers. As depicted in FIG. 1, SDN 100 may be part of a system that includes an operations module 102 in communication with a work flow automation module or an orchestrator 104. For example, operations module 102 may be an Oracle Rapid Service Design and Order Delivery (RSDOD) module configured to enable service providers to design and implement network services amongst existing networks, such as an existing SDN. Orchestrator 104 may be an Oracle Network Service Orchestrator (NSO) configured to orchestrate SDN 100 and other resources.

In some embodiments, operations module 102 may be triggered by an event (e.g., automated actions or human interaction) to determine what network resources within a given SDN 100 are required for implementation of the event. For example, a service order request for a network service may be transmitted to operations module 102, in which case operations module 102 may be triggered for determining what network resources within SDN 100 are required to implement the network service given a set of service specifications in the service order request. Other events triggered by the network, itself, may initiate operations module 102 to begin determining what network resources are required. Additionally, operations module 102 may construct a set network resources or applications that are needed, as well as connectivity requirements for each network resource or application. Continuing the above example, operations module 102 may determine that two network applications at layer 7, a router at layer 7, two routers at layer 4, and two switches at layer 3 are needed in order to implement the requested network service.

In some embodiments, operations module 102 may communicate with orchestrator 104 to transmit orchestration related data, and may initiate multi-layer orchestration of the network resources within SDN 100. In some embodiments, events (other than a service order request) from sources such as, e.g., orchestration systems, analytics, network components, assurance and fault management systems, etc., may trigger a module other than orchestration module 102 to communicate with orchestrator 104 to transmit orchestration related data, and may initiate multi-layer orchestration of the network resources within SDN 100. The orchestration related data can comprise the set of network resources or applications that are needed to implement the event, as well as connectivity information for each network resource or application. For example, where a triggering event is a network service request, the orchestration related data transmitted to orchestrator 104 may consist of network service catalogue information and/or a network service graph. The network service catalogue information may indicate the network resources needed to implement a network service and the network service graph may provide information for connecting (e.g., communicatively coupling) each of these network resources in relation to one another. In some embodiments, the orchestration related data may comprise other information, such as, analytics information, dynamic scaling information, etc.

In some embodiments, orchestrator 104 may be configured to determine configuration information for the network resources based on the orchestration related data and protocol layer capability of the network resources in order to orchestrate multi-layer connectivity at some of the network resources. For example, orchestrator 104 may be configured to analyze the orchestration related data received from operations module 102, as well as protocol layer capability from the network resources. Protocol layer capability may comprise an ability of a network resource to control network traffic using at least one criterion associated with a particular protocol layer. Analyzing the orchestration related data and the protocol layer capability may include determining what network resources are deployed in the network (e.g., SDN 100), determining what network resources are requested (e.g., as transmitted by operations module 102), determining which network resources are available in the network (e.g., SDN 100), computing network priorities, etc. In some embodiments, orchestrator 104 may analyze the orchestration related data and the protocol layer capability information by applying an optimization algorithm and/or policy to both sets of information in order to identify which network resources in SDN 100 provide an optimized flow of network traffic.

In some embodiments, orchestrator 104 is configured to perform multi-layer orchestration across protocol layers of network resources within SDN 100 as required by a triggering event. More particularly, orchestrator 104 may be configured to coordinate connectivity between network resources by providing the configuration information to identified network resources at different layers in SDN 100. For example, orchestrator 104 may be configured to provide each identified network resource or a proxy thereof with the configuration information such that network traffic may optimally flow between the identified network resources.

Still referring to FIG. 1, implementing a network service at SDN 100 may require orchestrator 104 to orchestrate connectivity between two layer 7 network applications. For example, the network service may require connectivity between a layer 7 network application one 106 and a layer 7 network application two 108, which may comprise two different SDN applications, each being located at a different site. In some embodiments, only one application may be required or, where two or more applications are required, the two or more applications may be co-located at the same site. However, for the sake of the following exemplary embodiment, the two layer 7 network applications are located at different sites. Layer 7 network applications may comprise any type of network functionality. For example, layer 7 network application one 106 may comprise a policy and charging rules function (PCRF), while layer 7 network application two 108 may comprise an online charging system (OCS).

In some embodiments, orchestrator 104 may be required to direct configuration information to other network resources within SDN 100 in order to orchestrate connectivity between layer 7 network applications one 106 and two 108. Orchestrator 104 may be configured to identify which network resources within SDN 100 provide an optimized flow of network traffic between layer 7 network applications one 106 and two 108 using, for example, an algorithm, policy, and/or other processing method. The identified network resources may be located at layers other than layer 7 and may comprise similar or different types of network resources, e.g., a layer 4 router. Where the network resources are located at layers other than the layer at which the layer 7 network application(s) is located, then orchestrator 104 may be configured to perform multi-layer orchestration by directing configuration information to the network resources at the lowest layers, i.e., layers 1-3, to make base connections and continue by directing configuration information to higher layers, i.e., layers 4-7. Alternatively, orchestrator 104 may be configured to perform multi-layer orchestration by directing configuration information to the network resources in a "top-down" approach, e.g., directing configuration information to higher layers first.

Each of the network resources in SDN 100 that are identified by orchestrator 104 may include functionality for receiving, processing, and/or switching or routing various messages and may include various communications interfaces for communicating with various network resources and/or nodes. In some embodiments, network resources in SDN 100 may communicate with SIP nodes, Diameter nodes, etc., e.g., via a Diameter protocol interface, an OpenFlow protocol interface, and/or other protocol interfaces.

In some embodiments, orchestrator 104 may direct configuration information and/or related routing information to network resource(s) at layer 7. For example, as illustrated in FIG. 1, orchestrator 104 may direct the configuration information to a layer 7 router 110. Layer 7 router 110 may comprise a Diameter signaling router (DSR) or a session initiation protocol (SIP) router capable of acting as a proxy or a load balancer. In some embodiments, orchestrator 104 may provide configuration information and/or related routing information for provisioning a routing table, e.g., a Diameter routing table, usable by layer 7 router 110.

In some embodiments, configuration information and/or related routing information may include layer 7 source addresses, layer 7 destination addresses, and layer 7 application IDs for layer 7 network applications, as well as associations and/or mappings therebetween. For example, in a layer 7 routing table, a layer 7 application ID may represent a look-up or key for indicating a layer 7 destination address associated with a network resource for performing the necessary processing associated with a Diameter packet. In another example, a layer 7 source address may be used as a look-up or key, while in another example, a layer 7 application ID and a layer 7 source address, as well as other layer 7 information, may be used as part of a composite look-up or key for identifying a layer 7 destination address.

In some embodiments, layer 7 router 110 may use the configuration information and/or the related routing information to determine how to route or process a Diameter packet comprising a Diameter source address, a Diameter destination address, and a Diameter application ID. For example, layer 7 router 110 may query a Diameter routing table to determine an appropriate destination for processing the Diameter packet. In this example, layer 7 router 110 may use layer 7 information in the Diameter packet as a look-up or key, such as a Diameter application ID, for determining the appropriate destination of the Diameter packet. After determining the appropriate destination, layer 7 router 110 may rewrite or replace an existing Diameter destination address in the Diameter packet with a Diameter destination address associated with the appropriate destination. In this manner, layer 7 router 110 may advantageously mask network topology from network resources and/or nodes outside SDN 100.

In some embodiments, orchestrator 104 may also direct the configuration information to network resources at layers other than layer 7. For example, orchestrator 104 may direct the configuration information and/or related routing information to two separate layer 4 routers. In view of FIG. 1, orchestrator 104 may direct configuration information and/or related routing information to a layer 4 router one 112 and a layer 4 router two 114 for provisioning a routing table, e.g., a layer 4 routing table, usable by the layer 4 routers to determine the appropriate destination address associated with a network resource in SDN 100. Layer 4 routers 112 and 114 may each comprise a transmission control protocol/internet protocol (TCP/IP) router.

In some embodiments, configuration information and/or routing information may include layer 4 mappings, layer 4 transactions or session identifiers, associations between layer 7 network applications and layer 4 network resources, etc. For example, in a layer 4 routing table, a layer 4 transaction identifier may represent a look-up or key for indicating a network resource for performing the necessary processing associated with a TCP/IP packet. In another example, other layer 4 configuration information and/or related routing information may be used as a look-up key for identifying an appropriate destination.

In some embodiments, layer 4 routers and/or other layer 4 network resources may use layer 4 configuration information and/or related routing information to determine how to route or process a TCP/IP packet comprising an IP source address, an IP destination address, and transport (e.g., TCP, user datagram protocol (UDP), or stream control transmission protocol (SCTP)). For example, where the layer 4 router is one of a layer 4 router one 112 and a layer 4 router two 114, the layer 4 router may query a layer 4 routing table to determine an appropriate destination for processing the TCP/IP packet. In this example, layer 4 routers 112 and 114 may each use TCP/IP address, port, and session information in the TCP/IP packet as a look-up or key for determining the appropriate destination of the TCP/IP packet. After determining the appropriate destination, layer 4 routers 112 and 114 may route the TCP/IP packet to the appropriate network resource.

In some embodiments, orchestrator 104 may direct configuration information to network resources at layers 1-3 in order to establish base connections. For example, orchestrator 104 may direct configuration information to a controller associated with network resources, such as one or more layer 3 switches. As illustrated in FIG. 1, a first controller 116 may be configured to control functionality of two layer 3 switches, e.g., switch one 120 and switch two 122 associated with layer 7 network application one 106, while a second controller 118 may be configured to control functionality of a layer 3 switch, e.g., switch three 124. Controller one 116 and controller two 118 may each be configured as an SDN controller.

Accordingly, the lines from orchestrator 104 to each of network resources 106-124 illustrate the automated management and signaling flow of multi-layer orchestration in a SDN. It will be appreciated that FIG. 1 is for illustrative purposes and that various network resources, their locations, and/or their functions described above in relation to FIG. 1 may be changed, altered, added, or removed. For example, some network resources and/or functions may be removed and/or combined into a single entity.

Figure 2:
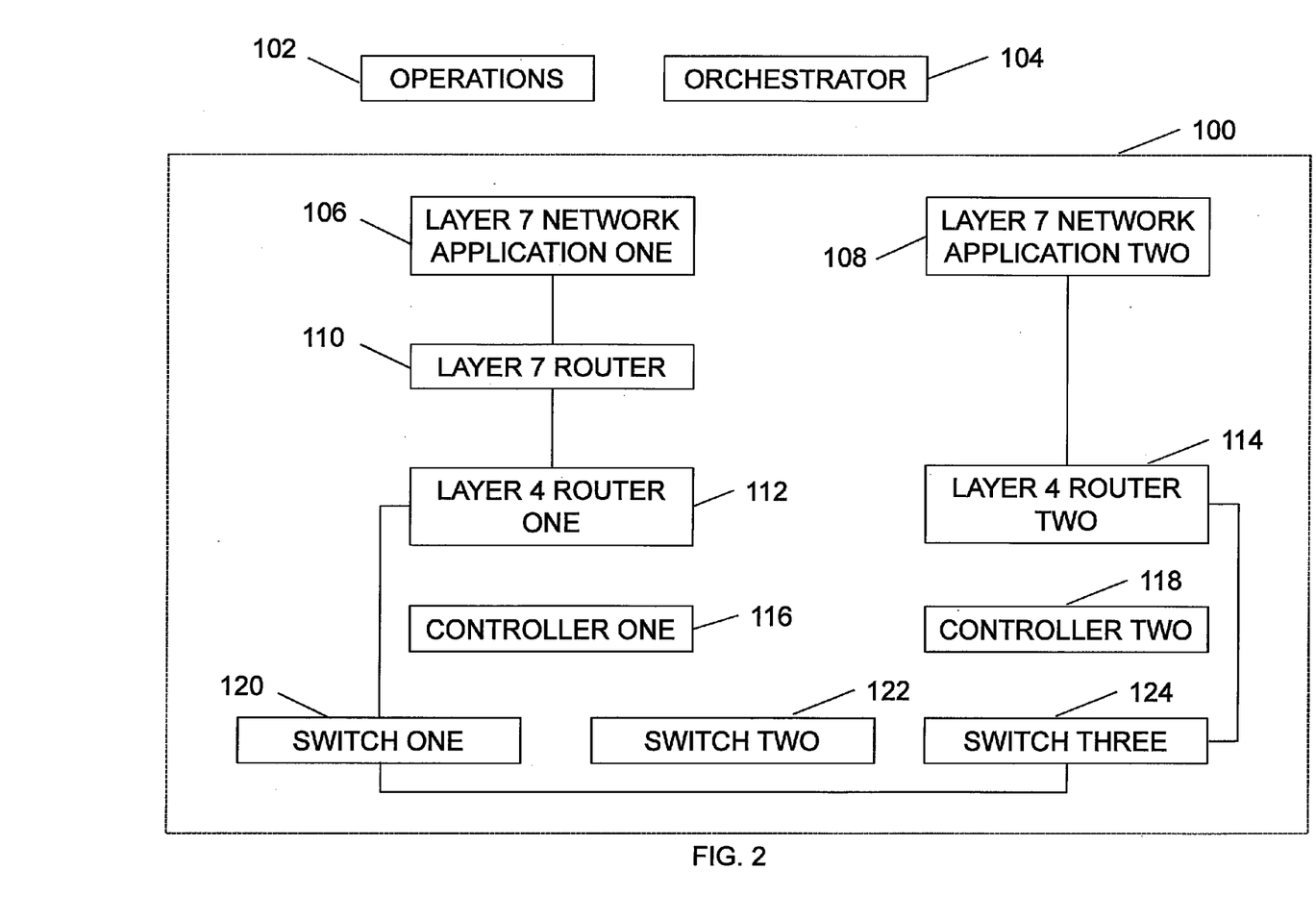
FIG. 2 is a diagram illustrating an exemplary embodiment of signaling results from multi-layer orchestration in the SDN of FIG. 1.

FIG. 2 is a diagram illustrating an exemplary embodiment of signaling flow results from automatic multi-layer orchestration and configuration actions taken by an orchestrator (e.g., 104) in SDN 100. Based on orchestration related data received from operations module 102, orchestrator 104 may be configured to identify which network resources within SDN 100 provide an optimized flow of network traffic between layer 7 network applications 106 and 108 using, for example, an algorithm, policy, and/or other processing method. The network resources in SDN 100 that are identified as providing optimized packet traffic flow are provided with configuration information and/or related routing information that results in the flow and signaling connectivity illustrated in FIG. 2 and further described, below, in relation to FIG. 3.

For example, in FIG. 1, orchestrator 104 provided configuration information to layer 7 network application one 106, layer 7 router 110, layer 4 router one 112, controller one 116, controller two 118, layer 4 router two 114, and layer 7 network application two 108. Since controller one 116 and controller two 118 are configured to control layer three switches 120-124, in this example, orchestrator 104 does not directly provide configuration information to the switches, although orchestrator 104 may have determined that such switches provide optimized packet traffic flow. Alternatively, orchestrator 104 may directly communicate with switches 120-124. Thus, due to the configuration information and/or related routing information provided by orchestrator 104, optimized flow connectivity between layer 7 network application one 106 and layer 7 network application two 108 is provided.

It will be appreciated that FIG. 2 is for illustrative purposes and that various network resources, their locations, and/or their functions described above in relation to FIG. 2 may be changed, altered, added, or removed. For example, some network resources and/or functions may be removed and/or combined into a single entity.

Figure 3:
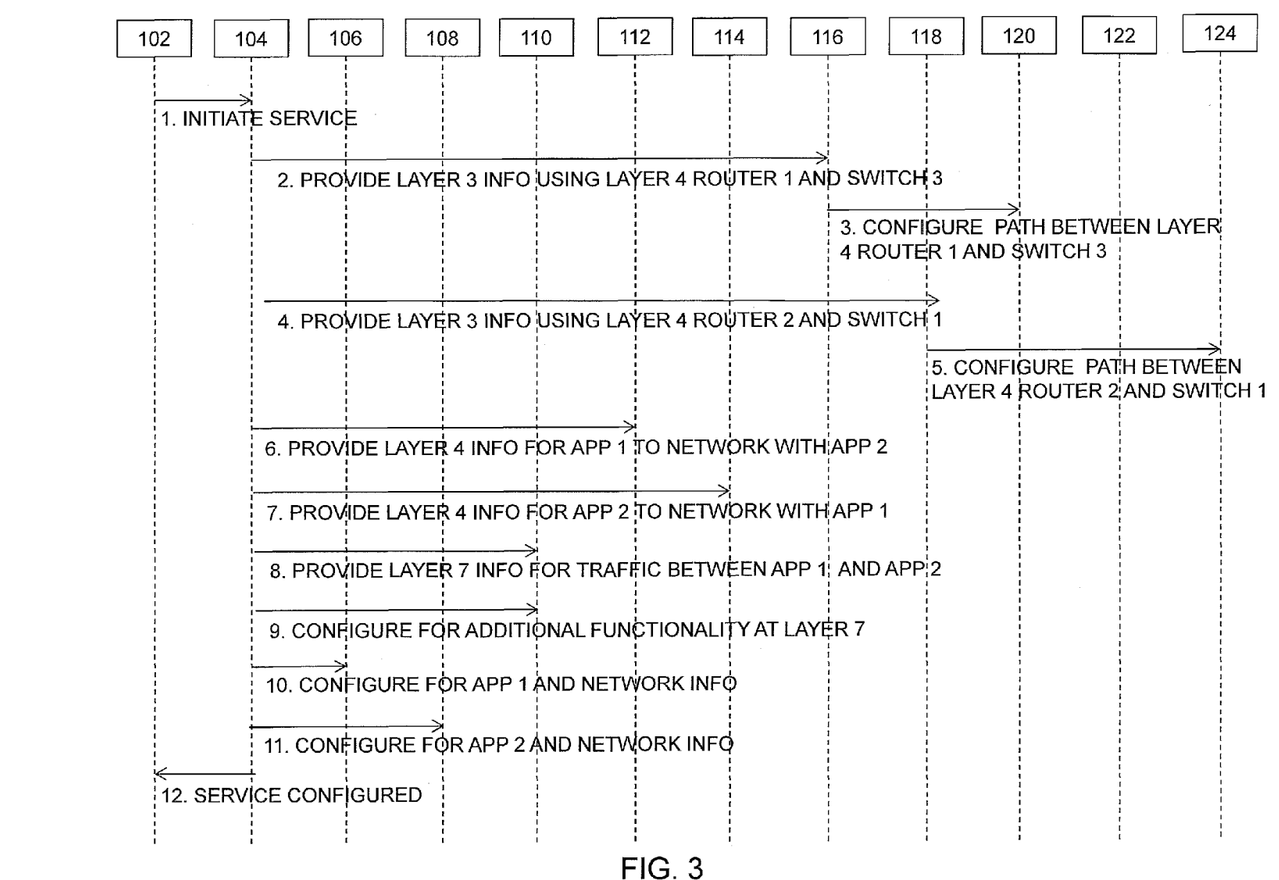
FIG. 3 is a flow diagram illustrating an exemplary embodiment of multi-layer orchestration in an SDN according to an embodiment of the subject matter described herein.

FIG. 3 is a flow diagram illustrating an exemplary embodiment for multi-layer orchestration between two layer 7 network applications in SDN 100 for implementing a network service based on a service order, according to an embodiment of the subject matter described herein. This example illustrates multi-layer orchestration in a "bottom-up" approach, where orchestrator 104 configures lower layers for flow connectivity prior to configuring higher layers. A "top-down" approach may also be used by orchestrator 104, where orchestrator 104 configures higher layers for flow connectivity prior to configuring lower layers.

At step 1, orchestration related data for implementing a network service using network resources within an SDN 100 may be transmitted from an operations module 102 to an orchestrator 104. In some embodiments, operations module 102 may transmit orchestration related data that may consist of network service catalogue information and/or a network service graph. The network service catalogue information may indicate the network resources needed to implement a network service and the network service graph may provide information for connecting (e.g., communicatively coupling) each of these network resources in relation to one another. In some embodiments, the orchestration related data may comprise other information, such as, analytics information, dynamic scaling information, etc. Notably, however, the orchestration related data may differ where a trigger other than a service order initiates multi-layer orchestration, e.g., dynamic scaling.

In some embodiments, orchestrator 104 may be configured to determine configuration information for the network resources based on the orchestration related data and protocol layer capability of the network resources in order to orchestrate multi-layer connectivity at some of the network resources, and subsequently perform multi-layer orchestration across protocol layers of network resources within SDN 100, e.g., as required by a triggering event. The following steps illustrate multi-layer orchestration, via orchestrator 104, at network resources identified by orchestrator 104 as providing optimized packet traffic flow in SDN 100. It may be appreciated that different network resources may be utilized depending on availability, efficiency, priorities, service order requirements, etc.

In some embodiments, as illustrated at step 2, orchestrator 104 may provide configuration information to controller one 116 in order to direct traffic from layer 4 router one 112 to switch three 124. Since controller one 116 is configured to control functionality of switch one 120 and switch two 122, controller one 116 may be provided with configuration information, such as, layer 1, layer 2, and/or layer 3 routing information, for directing certain traffic between layer 4 router one 112 and switch three 124. In this example, orchestrator 104 may have previously determined (e.g., based on optimization considerations) that traffic flows between layer 7 network application one 106 and layer 7 network application two 108 should pass from layer 4 router one 112 through switch one 120 to switch three 124, rather than pass from layer 4 router one 112 through switch two 122 to switch three 124. Thus, at step 3, controller one 116 may configure switch one 120 with configuration information, such as layer 1, layer 2, and/or layer 3 routing information, in order to provision packet flow connectivity between layer 4 router one 112 and switch three 124. Alternatively, in other embodiments, if switch two 122, or any other network resource are identified as an optimal path for traffic between layer 4 router one 112 and switch three 124, then such network resource would be provisioned with configuration information to direct traffic between layer 4 router one 112 and switch three 124.

At step 4, orchestrator 104 may provide configuration information to controller two 118 in order to direct traffic from layer 4 router two 114 to switch one 120. Since controller two 118 is configured to control functionality of switch three 124, controller two 118 may be provided with configuration information, such as, layer 1, layer 2, and/or layer 3 routing information, for directing certain traffic between layer 4 router two 114 and switch one 120. In this example, orchestrator 104 may have previously determined (based on optimization considerations) that traffic flows between layer 7 network application two 108 and layer 7 network application one 106 should pass from layer 4 router two 114 through switch three 124 to switch one 120. Thus, at step 5 controller two 118 may configure switch three 124 with configuration information, such as layer 1, layer 2, and/or layer 3 routing information, in order to provision packet flow connectivity between layer 4 router two 114 and switch one 120.

Thus, steps 2-5 illustrate automatic multi-layer orchestration at layers 2-3, although these steps are equally applicable for automatic multi-layer orchestration at layers 1, 2, or 3.

At step 6, orchestrator 104 may provide configuration information and/or related routing information to layer 4 router one 112 in order to direct traffic from layer 7 network application one 106 to layer 7 network application two 108. For example, such configuration information may include layer 4 mappings, layer 4 transactions or session identifiers, associations between layer 7 network applications and layer 4 network resources, etc., such that layer 4 router one 112 may determine an appropriate destination for an incoming packet. Accordingly, in this example, when layer 4 router one 112 receives a TCP/IP packet, layer 4 router one 112 may query accessible configuration information, e.g., stored in a local, layer 4 routing table, in order to route the TCP/IP packet to an appropriate destination (e.g., network resource) in SDN 100.

At step 7, orchestrator 104 may provide configuration information and/or related routing information to layer 4 router two 114 in order to direct traffic from layer 7 network application two 108 to layer 7 network application one 106. For example, such configuration information may include layer 4 mappings, layer 4 transactions or session identifiers, associations between layer 7 network applications and layer 4 network resources, etc., such that layer 4 router two 114 may determine an appropriate destination for an incoming packet. Accordingly, in this example, when layer 4 router two 114 receives a TCP/IP packet, layer 4 router two 114 may query accessible configuration information, e.g., stored in a local, layer 4 routing table, in order to route the TCP/IP packet to an appropriate destination (e.g., network resource) in SDN 100.

At step 8, orchestrator 104 may provide configuration information and/or related routing information to layer 7 router 110 in order to direct traffic from layer 7 network application one 106 to layer 7 network application two 108. For example, orchestrator 104 may provide configuration information and/or related routing information for provisioning a layer 7 routing table, e.g., a Diameter routing table, usable by layer 7 router 110. In some embodiments, configuration information may include layer 7 source addresses, layer 7 destination addresses, layer 7 application IDs, translation information, etc., for storage in a Diameter routing table. Using layer 7 address information stored in a packet as a look-up or a key, the configuration information stored in the layer 7 routing table may be used for indicating an appropriate destination for performing the necessary processing associated with a packet.

In some embodiments, layer 7 router 110 may comprise a Diameter signaling router (DSR), such that the layer 7 routing table is a Diameter routing table comprising configuration information that may include Diameter source addresses, Diameter destination addresses, Diameter application IDs, etc. In such embodiments, layer 7 DSR 110 may use the Diameter configuration information and/or related routing information to determine how to route or process a Diameter packet comprising a Diameter source address, a Diameter destination address, and a Diameter application ID. For example, layer 7 router 110 may query a Diameter routing table to determine an appropriate destination for processing the Diameter packet. In some embodiments, at step 9, orchestrator 104 may configure layer 7 router 110 for additional functionality, such as, e.g., functionality to perform load balancing or act as a proxy. In some embodiments, layer 7 router 110 may comprise a DSR or a SIP capable of acting as a proxy or a load balancer. For example, layer 7 DSR 110 may use Diameter address information in a Diameter packet as a look-up or key, such as a Diameter application ID, for determining an appropriate destination of the Diameter packet. After determining the appropriate destination, layer 7 DSR 110 may rewrite or replace an existing Diameter destination address in the Diameter packet with a Diameter destination address associated with the appropriate destination.

At step 10, orchestrator 104 may configure layer 7 network application one 106 with configuration information, such as layer 7 address information for layer 7 router 110. In some embodiments, layer 7 address information for layer 7 router 110 that layer 7 network application one 106 is configured with may be local layer 7 address information. This is because layer 7 router 110 and layer 7 network application one 106 are co-located at a same site. However, were layer 7 router 110 and layer 7 network application one 106 located at different sites, then layer 7 network application one 106 may be provided with different, non-local layer 7 address information for layer 7 router 110.

Likewise, at step 11, orchestrator 104 may configure layer 7 network application two 108 with configuration information, such as layer 7 address information for layer 7 router 110. In this embodiment, the layer 7 address information for layer 7 router 110 that layer 7 network application two 108 is configured with is different than the local layer 7 address information that layer 7 network application one 106 is configured with because layer 7 network application two 108 is not co-located with layer 7 router 110. Instead, the layer 7 address information for layer 7 router 110 that layer 7 network application two 108 is configured with is routable by layer 4 router two 114. In this way, incoming packets between network applications that are not co-located can be properly routed through layer 7 router 110.

At step 12 orchestrator 104 may optionally notify operations module 102 that orchestrating connectivity between layer 7 network application one 106 and layer 7 network application two 108 is complete, i.e., that automatic, multi-layer orchestration has resulted in flow connectivity between the two layer 7 network applications.

Notably steps 6-11 may be performed by orchestrator 104 prior to steps 2-5 such that orchestrator 104 may perform multi-layer orchestration in a "top-down" approach.

Figure 4:
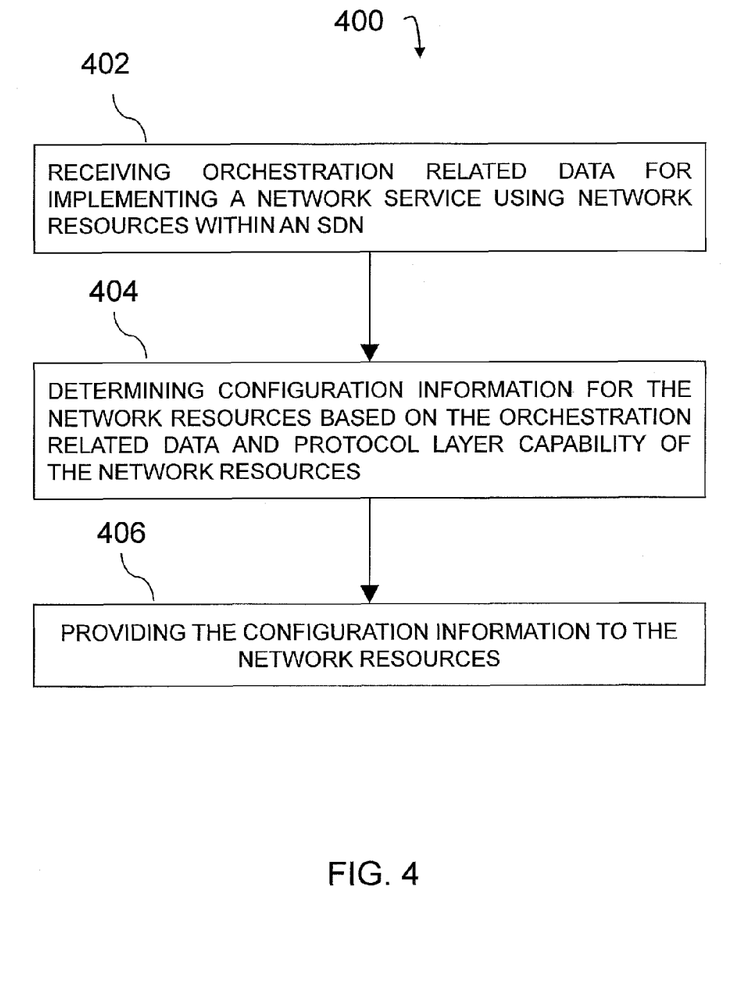
FIG. 4 is a flow chart illustrating an exemplary embodiment of a method for multi-layer orchestration in an SDN according to an embodiment of the subject matter described herein.

FIG. 4 is a flow chart depicting an exemplary method, generally designated 400, for multi-layer orchestration in an SDN according to an embodiment of the subject matter described herein. Referring to FIG. 4, in block 402, orchestration related data for implementing a network service using network resources within an SDN is provided to an orchestrator 104.

In some embodiments, an operations module 102 may provide orchestrator 104 with the orchestration related data, which may consist of network service catalogue information and network service graph. For example, the network service catalogue information may indicate the network resources needed to implement a network service and the network service graph may provide information for connecting (e.g., communicatively coupling) each of these network resources in relation to one another.

In some embodiments, the orchestration related data may comprise other information, such as, analytics information, dynamic scaling information, etc.

In block 404, orchestrator 104 may determine configuration information for the network resources based on the orchestration related data and protocol layer capability of the network resources.

In some embodiments, the protocol layer capability of a network resource may comprise an ability of a network resource to control network traffic using at least one criterion associated with a particular protocol layer.

In some embodiments, determining the configuration information for the network resources may comprise analyzing the orchestration related data and the protocol layer capability. For example, analyzing the orchestration related data and the protocol layer capability may include determining what network resources are deployed in the network (e.g., SDN 100), determining what network resources are requested (e.g., as transmitted by operations module 102), determining which network resources are available in the network (e.g., SDN 100), computing network priorities, etc.

In some embodiments, orchestrator 104 may analyze the orchestration related data and the protocol layer capability by applying an optimization algorithm and/or policy to both sets of information in order to identify which network resources in SDN 100 provide an optimized flow of network traffic.

In block 406, orchestrator 104 may provide the configuration information to the network resources. In some embodiments, the network resources may comprise at least one of a switch, a router, a layer 3 switch, a layer 3 router, a layer 4 router, a layer 7 application server, a layer 7 router, a controller, and another network element. SDN 100 may comprise network resources different than, more than, less than, etc., than those described above.

It will be appreciated that exemplary process 400 is for illustrative purposes and that different and/or additional actions may be used. It will also be appreciated that various actions described herein may occur in a different order or sequence.

Figure 5:
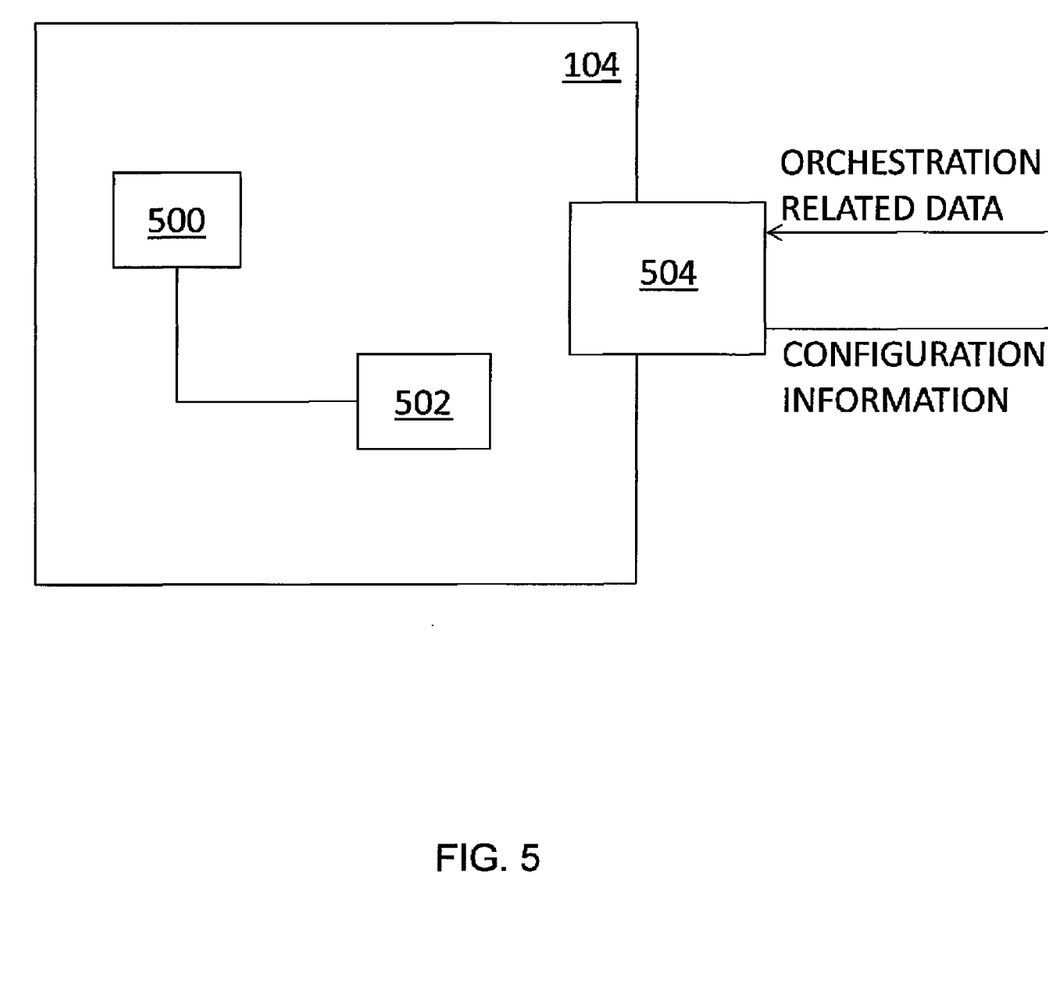
FIG. 5 is a block diagram illustrating exemplary components of an orchestrator used for multi-layer orchestration in an SDN according to an embodiment of the subject matter described herein.

FIG. 5 is a high level block diagram of exemplary components of orchestrator 104 used for multi-layer orchestration in SDN 100. As illustrated in FIG. 5, orchestrator 104 comprises at least one processor 500, memory 502, and communications interface 504. In some embodiments, processor 500 may comprise a microprocessor, central processing unit (CPU), or any other like hardware based processing unit. In some embodiments, memory 502 may comprise random access memory (RAM), read only memory (ROM), optical read/write memory, cache memory, magnetic read/write memory, flash memory, or any other non-transitory computer readable medium. In some embodiments, processor 500 and memory 502 may be used to execute and process an orchestration module (not shown) stored in memory 502 for performing multi-layer orchestration in SDN 100. In some embodiments, communications interface 504 may be communicatively connected to the at least one processor 500 and memory 502 via a system bus (not shown). In some embodiments, communications interface 504 may comprise a network interface card (NIC), which may be an Ethernet card or other I/O interface card that allows orchestrator 104 to communicate with other network resources, devices, modules, etc., over SDN 100 and/or other networks. For example, NIC 504 may receive orchestration related data from operations module 102. In another example, NIC 504 may transmit configuration information to identified network resources in SDN 100. Thus, when configured as described herein, orchestrator 104 becomes a special purpose computing platform that can improve the technological field of multi-layer orchestration of an SDN by automatically performing multi-layer orchestration, rather than doing so manually.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for multi-layer orchestration in a software defined network (SDN), the method comprising:
at an orchestrator comprising a hardware processor and for optimizing network resources within an SDN:
receiving orchestration related data for implementing a network service using the network resources within the SDN;
determining configuration information for the network resources based on the orchestration related data and protocol layer capability of the network resources, wherein determining the configuration information includes identifying the network resources having the protocol layer capability to provide network services; and
providing the configuration information to the network resources.

2. The method of claim 1 wherein receiving the orchestration related data comprises receiving the orchestration related data from an operations module.

3. The method of claim 1 wherein receiving the orchestration related data includes receiving at least one of:
network service catalogue information; and
a network service graph.

4. The method of claim 1 wherein determining the configuration information for the network resources comprises analyzing the orchestration related data and the protocol layer capability of the network resources and identifying to which of the network resources to provide the configuration information.

5. The method of claim 4 wherein analyzing the orchestration related data and the protocol layer capability of the network resources comprises applying an algorithm to the orchestration related data and the protocol layer capability of the network resources to determine which of the network resources provide an optimized flow of network traffic.

6. The method of claim 1 wherein the protocol layer capability comprises an ability of a network resource to control network traffic using at least one criterion associated with a particular protocol layer.

7. The method of claim 1 wherein the network resources comprise at least one of a switch, a router, a layer 3 switch, a layer 3 router, a layer 4 router, a layer 7 application server, a layer 7 router, a controller, and another network element.

8. The method of claim 1 wherein providing the configuration information to the network resources comprises automatically orchestrating connections between the network resources.

9. The method of claim 8 wherein automatically orchestrating the connections between the network resources comprises automatically orchestrating a connection between a layer n network resource and at least one layer m network resource, where n and m are integers and n is different from m.

10. The method of claim 9 wherein automatically orchestrating the connections between the network resources comprises automatically orchestrating a connection between a layer 7 router and at least one layer 4 router.

11. A system for multi-layer orchestration in a software defined network (SDN), the system comprising:
an orchestrator comprising at least one processor and memory, and for optimizing network resources within an SDN, the orchestrator being configured to receive orchestration related data for implementing a network service using the network resources within the SDN, determine configuration information for the network resources based on the orchestration related data and protocol layer capability of the network resources, and provide the configuration information to the network resources;
wherein the orchestrator being configured to determine the configuration information includes identifying the network resources having the protocol layer capability to provide network services.

12. The system of claim 11 wherein the orchestration related data is received from an operations module.

13. The system of claim 11 wherein the orchestration related data includes at least one of:
network service catalogue information; and
a network service graph.

14. The system of claim 11 wherein the orchestrator is further configured to analyze the orchestration related data and the protocol layer capability of the network resources and identify to which of the network resources to provide the configuration information.

15. The system of claim 14 wherein the orchestrator is configured to apply an algorithm to the orchestration related data and the protocol layer capability of the network resources to determine which of the network resources provide an optimized flow of network traffic.

16. The system of claim 11 wherein the protocol layer capability comprises an ability of a network resource to control network traffic using at least one criterion associated with a particular protocol layer.

17. The system of claim 11 wherein the network resources comprise at least one of a switch, a router, a layer 3 switch, a layer 3 router, a layer 4 router, a layer 7 application server, a layer 7 router, a controller, and another network element.

18. The system of claim 11 wherein the orchestrator is configured to automatically orchestrate connections between the network resources.

19. The system of claim 18 wherein the orchestrator is configured to automatically orchestrate a connection between a layer 7 router and at least one layer 4 router.

20. A non-transitory computer readable medium having stored thereon computer executable instructions embodied in a computer readable medium and when executed by a processor of a computer performs steps comprising:
at an orchestrator comprising a hardware processor and for optimizing network resources within a software defined network (SDN):
receiving orchestration related data for implementing a network service using the network resources within the SDN;
determining configuration information for the network resources based on the orchestration related data and protocol layer capability of the network resources, wherein determining the configuration information includes identifying the network resources having the protocol layer capability to provide network services; and
providing the configuration information to the network resources.

* * * * *

UNITED STATES PATENT AND TRADEMARK OFFICE
CERTIFICATE OF CORRECTION

PATENT NO. : 9,917,729 B2
APPLICATION NO. : 14/692710
DATED : March 13, 2018
INVENTOR(S) : McMurry et al.

Page 1 of 1

It is certified that error appears in the above-identified patent and that said Letters Patent is hereby corrected as shown below:

On the Title Page

Item (54) replace "METHODS, SYSTEMS, AND COMPUTER READABLE MEDIA FOR MULTI-LAYER ORCHESTRATION IN SOFTWARE DEFINED NETWORKS (SDNS)" with --METHODS, SYSTEMS, AND COMPUTER READABLE MEDIA FOR MULTI-LAYER ORCHESTRATION IN SOFTWARE DEFINED NETWORKS (SDNs)--

Signed and Sealed this
Eleventh Day of December, 2018

Andrei Iancu
*Director of the United States Patent and Trademark Office*

UNITED STATES PATENT AND TRADEMARK OFFICE
CERTIFICATE OF CORRECTION

PATENT NO. : 9,917,729 B2  
APPLICATION NO. : 14/692710  
DATED : March 13, 2018  
INVENTOR(S) : McMurry et al.

Page 1 of 1

It is certified that error appears in the above-identified patent and that said Letters Patent is hereby corrected as shown below:

On page 3, Column 1, under Other Publications, Line 42, delete "(Unpublised," and insert -- (Unpublished, --, therefor.

On page 3, Column 1, under Other Publications, Line 68, delete "Network,"" and insert -- Networks," --, therefor.

Signed and Sealed this  
First Day of January, 2019

Andrei Iancu  
*Director of the United States Patent and Trademark Office*